May 7, 1935.  R. S. FETTER  2,000,831
CLOSURE FOR FRUIT JARS AND THE LIKE
Filed Sept. 6, 1933
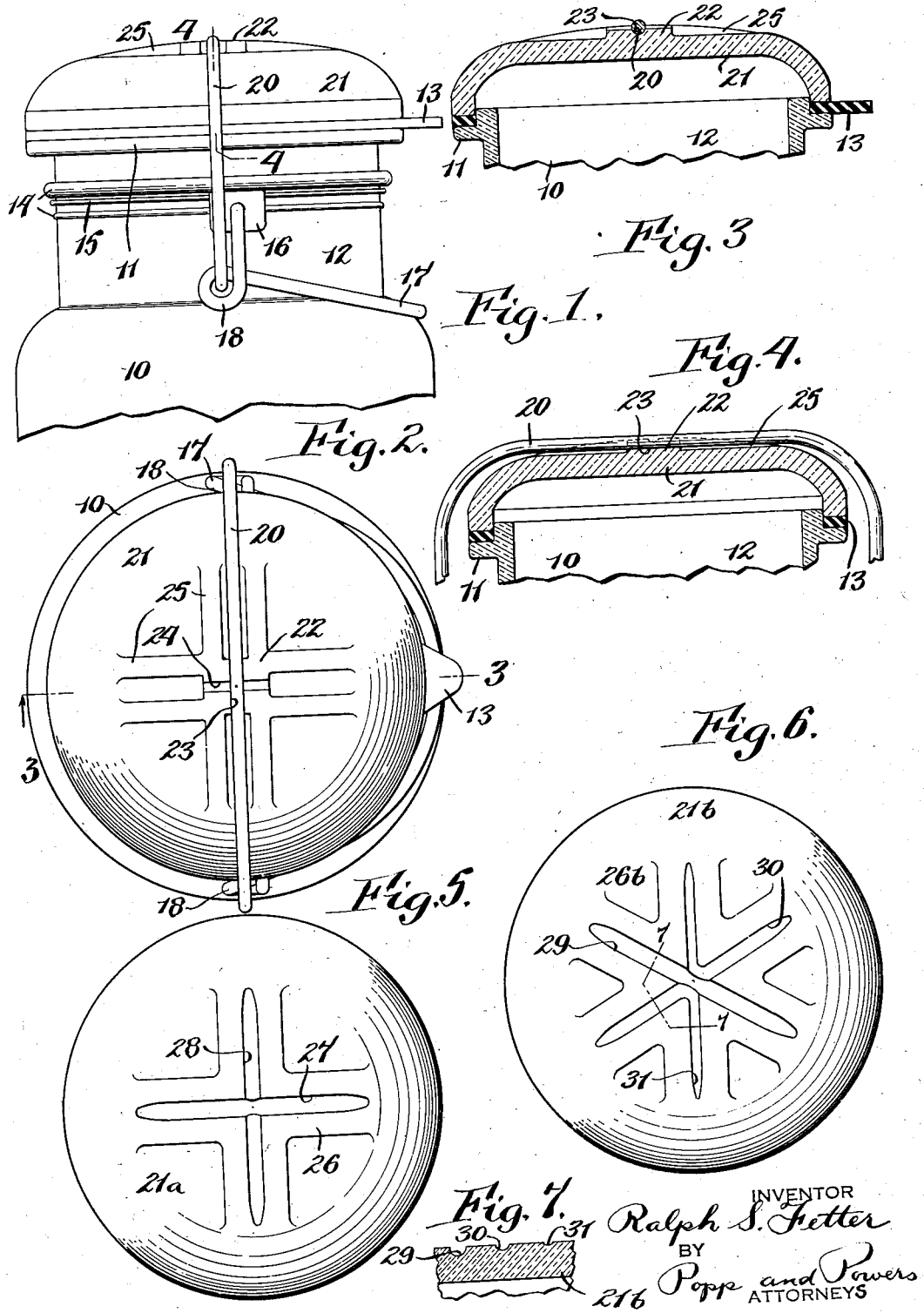

Patented May 7, 1935

2,000,831

UNITED STATES PATENT OFFICE 2,000,831

CLOSURE FOR FRUIT JARS AND THE LIKE

Ralph S. Fetter, Buffalo, N. Y.

Application September 6, 1933, Serial No. 688,316

2 Claims. (Cl. 215—86)

This invention relates to closures for fruit jars and the like and more particularly to that type of fruit jar closure in which the jar is provided with a rubber and a glass cap is pressed against the rubber by a pair of bails which are pivotally secured to the neck of the jar so as to force the cap downwardly and provide an air-tight seal.

In such fruit jar closures as now made the glass top for the jar is provided at its center with a raised boss in which a single notch is provided, one of the bails of the closure resting in this notch and forcing the boss and cover downwardly when the bails are moved to their closed position. However, after a relatively small amount of use the bails become stretched and distorted so that they no longer press the cap into air-tight sealing engagement with the rubber fruit jar ring and jar so that spoilage of the canned fruit is liable to occur. At the same time it is desirable to have the bail bear only against the central part of the cover so that the cover is pressed evenly down upon the fruit jar ring at all places and is not subject to any distortion.

It is the object of the present invention to avoid the above difficulties by providing a fruit jar cover having a boss at its center and in which the boss is provided with a plurality of grooves in cruciform or star arrangement, the grooves being at different elevations so that when the bail is stretched after using it in the lowermost groove, the cover can be shifted so as to catch the bail in a higher groove, thereby compensating for the stretch of the bail and insuring a tight seal. It is also highly important that these grooves be located in a raised boss at the center of the fruit jar cover to insure uniform pressure at all parts of the periphery of the cover where it bears upon the fruit jar ring and it is also desirable to have guide ridges radiating from the central lug for strengthening the central boss and which are so arranged as not to interfere with the use of any groove in effecting a sealed closure.

In the accompanying drawing:

Fig. 1 is a fragmentary side elevation of a fruit jar having a cover made in accordance with my invention and showing the same secured to the top of the fruit jar by the usual double bail closure.

Fig. 2 is a top plan view of the fruit jar shown in Fig. 1.

Fig. 3 is a vertical central cross section taken on line 3—3, Fig. 2.

Fig. 4 is a fragmentary vertical section taken on line 4—4, Fig. 1.

Fig. 5 is a top plan view of a modified form of jar cover embodying my invention.

Fig. 6 is a similar top plan view of a fruit jar cover embodying a further modified form of my invention.

Fig. 7 is a fragmentary vertical section taken on line 7—7, Fig. 6.

The fruit jar 10 shown is of the conventional shape having an annular external bead 11 on its neck 12 on which the usual fruit jar rubber 13 is arranged. Below the bead 11 the neck of the fruit jar is provided with a pair of spaced external beads 14 which receive a wire ring 15. To opposite sides of this wire ring are secured a pair of pressed metal ears 16, each having a hole adapted to receive one end of a wire bail 17, the wire bail 17 pivoting in these holes. The wire bail 17 is of symmetrical form and is formed in each leg to provide an eye 18, and is so formed that in the closed position the loop of the bail rests against the side of the friut jar and the legs beyond the eyes 18 are arranged vertically, as best shown in Fig. 1. Upon raising the loop of the bail 17 the eyes 18 are brought under and beyond the center of the hole in the ears 16. A U-shaped bail 20 extends across the mouth of the fruit jar and its ends are turned inwardly to engage the eye 18 of the bail 17. The cover 20 of the fruit jar is preferably made of cast glass and is formed at its rim to fit around the neck of the bottle 10 and to seat on the fruit jar ring 13. This cover is provided on its upper side with a central boss or elevation 22 against which the bail 20 presses. It is apparent that when the bail 17 is forced downwardly against the side of the fruit jar, the bail 20 will be drawn downwardly and force the cover 21 into sealed engagement with the fruit jar rubber 13. In so forcing the bail 17 downwardly the eye 18 is carried beyond dead center so that the bails 17 and 20 are locked in the position in which they seal the cover. Upon lifting the bail 17 the eye 18 is carried to the right of dead center, as viewed in Fig. 1, and thereafter raises the bail 20. The bail 20, after being raised, can be swung downwardly against the side of the fruit jar 10 and the fruit jar cover can therefore be removed.

In fruit jar covers as now made a boss is provided in the central upper part of the cover and this boss is provided with a recess which receives the center of the bail 20 so as to hold it in proper position while clamping down the lower bail 17. However, after being in use for a short period of time the bail 20 becomes stretched so that it no longer tightly clamps the fruit jar cover down, To avoid this, the present invention proposes to provide means which permit of compensating for the stretch of the bail 20 and for this purpose the boss 22 is provided with one relatively deep groove 23 which extends diametrically across the boss and another relatively shallow groove 24 which extends diametrically across the boss 22 at right angles to the groove 23. In addition radiating ridges 25 extend outwardly from the boss 22, these ridges being of tapering form and merging into the top of the cover adjacent its periphery, these ridges serving to strengthen the top and also serving as a means for guiding the bail 20 up onto the boss and into the corresponding groove 23 or 24, as the bail is swung upwardly into locking position. In first using the fruit jar the housewife selects the deeper groove 23 and arranges the cover so that this groove is parallel with the bail 20 when it is elevated to its operative position. When, after use, the bail becomes stretched and no longer effects a tight seal of the cover on the fruit jar rubber the housewife selects the shallower groove 24. In using this groove the effective thickness of the cover is increased and hence the stretch of the bail 20 is compensated for and a tight seal is effected by the clamp. The guide ridges 25 are preferably so arranged that the bail 20 bears only on the boss 22 and for this purpose the guide ridges 25 are in cruciform arrangement and are eight in number so as to provide spaces between them to receive the sides of the bail 20.

In the modified form of the invention shown in Fig. 5 the fruit jar cover 21a is raised at its center to provide a cruciform elevation 26 the legs of which slant downwardly and outwardly so as to permit the bail 20 being readily guided into the cruciform grooves 27 and 28 which are formed in the cruciform elevation 26. The groove 27 is deeper than the groove 28 and is selected when the fruit jar is new and the shallower groove 28 is selected after the fruit jar has been used to compensate for the stretching of the bail 20.

It is apparent that with the form of the invention shown in Fig. 5 any number of grooves of different elevations can be employed. In Fig. 6 the fruit jar cover 21b is provided with a star shaped central elevation 28b which is similar in form to the cruciform elevation 26 in the form of the invention shown in Fig. 5. The star shaped elevation 26b is shown as having six lateral extensions in which are cut three radial grooves 29, 30 and 31, these grooves being progressively shallower. It is apparent that any one of the three grooves can be selected to effect the desired seal of the fruit jar.

It is apparent from the foregoing that the present invention provides an improved closure for the common type of fruit jar in which the vertical bail bears on the center of the cover so as to insure uniform sealing against all parts of the usual rubber ring and at the same time permits, by the selection of the groove of different depths, of using the fruit jar indefinitely by compensating for the stretching of the bail which forms a part of the closure.

I claim as my invention:

1. A closure for jars having a jar body and a cover fitted over the mouth of said body, comprising a bail pivoted to said body and arranged to be swung along the upper side of said cover, said cover being provided centrally with an integral elevated portion provided on its upper side with grooves in cruciform arrangement and of different depths and each groove forming a seat for the center of said bail and means for leading the center of said bail up to said elevation comprising at least four ridges in cruciform arrangement and arranged substantially at right angles to said grooves, said ridges radiating from said elevation and being of substantially the same height as said elevation at their inner ends and becoming shallower toward their outer ends, and said ridges also forming reinforcing ridges for said cover.

2. A closure for jars having a jar body and a cover fitted over the mouth of said body, comprising a bail pivoted to said body and arranged to be swung along the upper side of said cover, said cover being provided centrally with an integral elevated porton provided on its upper side with grooves in cruciform arrangement and of different depths and each groove forming a seat for the center of said bail and means for leading the center of said bail up to said elevation comprising at least four ridges in cruciform arrangement and arranged substantially at right angles to said grooves, said ridges radiating from said elevation in line with said grooves, said ridges being of substantially the same height as said elevation at their inner ends and becoming shallower toward their outer ends, said ridges also forming reinforcing ribs for said cover and being provided with central longitudinal grooves to permit the bail to seat in the grooves in said elevation.

RALPH S. FETTER.